3,462,727
ELECTRICAL CONNECTOR OR THE LIKE HAVING COUPLING NUT DETENT MEANS

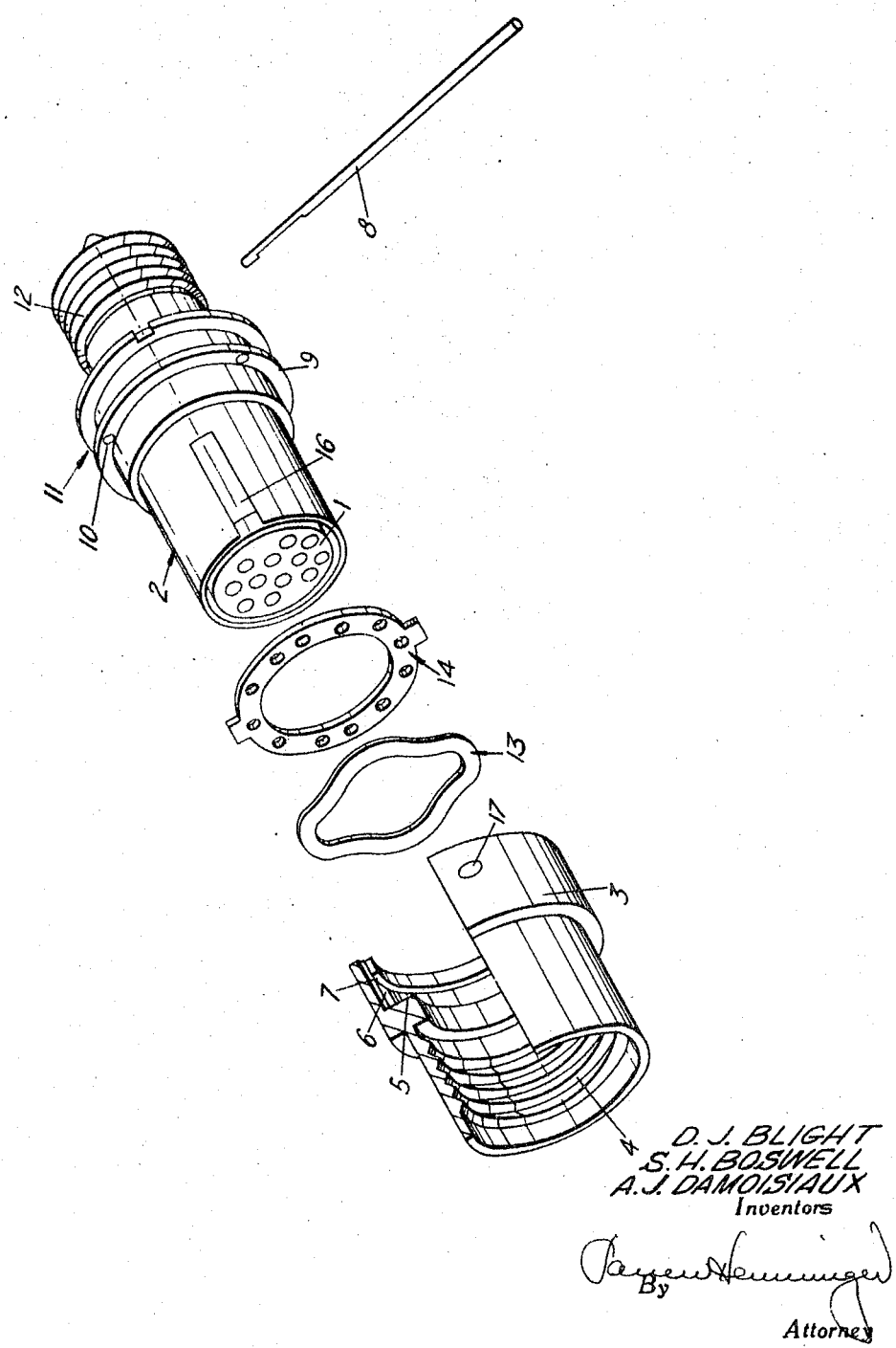

Dennis Jack Blight, Stanley Harold Boswell, and Anthony John Damoisiaux, Basingstoke, England, assignors to International Standard Electric Corporation, New York, N.Y., a corporation of Delaware
Filed May 25, 1967, Ser. No. 671,900
Claims priority, application Great Britain, June 3, 1966, 24,793/66
Int. Cl. H01r 13/54; F16l 55/00; F16b 39/28
U.S. Cl. 339—89                 2 Claims

ABSTRACT OF THE DISCLOSURE

The invention includes a coupling apparatus for an electrical connector or the like to prevent a coupling nut from becoming loose due to vibration. Three ball shaped projections are urged against a rigid and apertured detent washer. The projections thus can slip from one set of detent washer holes to another, but not without the application of some substantial torque.

---

This invention relates to a coupling arrangement for fastening two cylindrical members, such as two parts of a connector element or two connector elements, together.

The object of the invention is to provide a simple and compact arrangement whereby a nut for coupling the two parts is locked against accidental rotation, possibly due to vibration.

According to the present invention there is provided a coupling arrangement for interconnecting two cylindrical elements, in which a first of said elements has a plurality of detents spaced along the circumference of a circle, while a second of said two elements has a flat member with recesses arranged in a circle of the same diameter as the circle on which said detents are arranged, each said recess being able to receive one of said detents, in which said flat member is coaxial with the elements to be interconnected and is axially attached to said second element, and in which when said elements are fitted together the face of said flat member is spring-urged against a parallel flat face on said first element, which flat face carries said detents.

The arrangement is especially suitable for interconnecting two parts of a connector element, or for interconnecting two such elements, and the accompanying drawing shows an arrangement for interconnecting two connector elements.

The connector element includes an insert 1 containing the contacts, which insert fits into a casing 2. This casing carries a coupling nut 3, which has an internal screw thread 4 intended to receive a corresponding thread on the other connector element. This nut 3 has an inner flat face 5, and two short, diametrically-opposed grooves one of which is shown at 6. There is also a groove 7 which extends over the whole circumference of the nut for the reception of a thrust wire indicated at 8.

The casing has a flange 9 on its outside, which carries three equi-spaced balls such as 10, these balls being the detents mentioned above. Behind the flange there is a thrust-wire groove 11, and a screw-thread 12. The remaining parts are a crinkle washer 13, and a detent washer 14. The washer 14 has two lugs and a ring of recesses, shown as holes.

When the connector element is to be assembled, the washer 13, which is of springy material, is placed inside the coupling and against the face 5, which thus acts as a locating surface. Next the detent washer is fitted in with its lugs in the two grooves such as 6. The casing 2, which has a keyway 16 for co-operation with a key in the shell of the mating connector element (not shown) is then fitted to bring the flange 9 and its balls 10 against the washer 14.

Next the thrust wire 8 is fitted into the device via a hole 17 which communicates with the two thrust-wire grooves 7 and 11, which now together form a channel to receive the wire. A special tool is used to pull this wire in, the tool co-operating with the notch at the end of the wire 8. The thrust wire locates the coupling nut axially on the casing 2.

The dimensions of the casing 2 and coupling nut 3 are such that when the nut is located on the casing by the thrust wire 8, the correct degree of spring pre-loading of the detent washer 14 by the crinkle washer 13 is obtained.

As the coupling nut is rotated to engage the shell of the other connector element (not shown) the detent washer rides over the balls, which engage and disengage successively in the recesses in the washer 14. This gives a "click-stop" action. Axial movement of the detent washer due to its movement over the balls is accommodated by the crinkle washer, and produces a corresponding movement of the lugs on the washer 14 in their grooves such as 6.

The restraining force exerted by the interaction of the balls and the holes in the washer 14 is such as to counteract any tangential uncoupling forces due to severe vibration such as occurs when fitted near to an aircraft engine. This restraining force is not, however, great enough to prevent the normal engagement or disengagement of the coupling nut.

We claim:
1. An electrical connector comprising: a coupling nut having an open cylindrical extension at one end, said nut having an annular shoulder around the interior of said extension spaced inwardly from the end thereof, said shoulder projecting radially inward inside said extension; an annular detent washer inside said extension, said detent washer having a plurality of at least three equally spaced holes therethrough, said detent washer having at least one radial projection, said extension having an internal axial groove to fit contiguously around said detent washer projection; an undulated spring washer compressed between said detent washer and said shoulder; a connector body having a radially and outwardly extending annular flange carrying at least three equally spaced ball shaped projections each to fit in three of said detent washer holes simultaneously, each ball shaped projection being angularly spaced from the other two; and means to hold said body and said nut together to keep said spring washer in compression between said extension shoulder and said detent washer, rotation of said nut being resisted by said detent washer with said projections in said grooves, axial movement of said detent washer being yieldingly resisted by the force of said spring washer in urging said detent washer axially with the edges thereof defining said holes being located around said ball shaped projections.

2. In coupling apparatus, the combination comprising: a coupling nut; a detent washer inside said nut; said detent washer having a set of 3N holes therethrough, where N is any positive integer; a guide arrangement to hold said detent washer in a fixed angular but movable axial position relative to said nut; a body having at least three axially extending ball shaped projections to fit in at least three of said holes simultaneously; spring means to bias said detent washer away from said nut against said ball projections; and means to hold said body and said nut together against the force of said spring means.

(References on following page)

References Cited

UNITED STATES PATENTS

| | | | |
|---|---|---|---|
| 2,819,097 | 1/1958 | Lang | 285—81 |
| 2,890,434 | 6/1959 | Ray et al. | 339—91 |
| 3,351,886 | 11/1967 | Zimmerman | 339—90 |

FOREIGN PATENTS

| | | |
|---|---|---|
| 1,188,157 | 9/1959 | France. |
| 1,419,531 | 10/1965 | France. |
| 825,579 | 12/1959 | Great Britain. |
| 857,344 | 12/1960 | Great Britain. |
| 1,067,211 | 5/1967 | Great Britain. |

MARVIN A. CHAMPION, Primary Examiner

J. H. McGLYNN, Assistant Examiner

U.S. Cl. X.R.

151—34; 285—89